United States Patent [19]

Dunster et al.

[11] Patent Number: 4,865,820

[45] Date of Patent: Sep. 12, 1989

[54] GAS MIXER AND DISTRIBUTOR FOR REACTOR

[75] Inventors: Michael Dunster, Gerrards Cross, England; Joseph D. Korchnak; Jerome H. Marten, both of Lakeland, Fla.

[73] Assignee: Davy McKee Corporation, Houston, Tex.

[21] Appl. No.: 85,159

[22] Filed: Aug. 14, 1987

[51] Int. Cl.$^4$ ............................................... B01J 8/02
[52] U.S. Cl. ................................. 422/220; 422/191; 422/198; 422/310; 431/346
[58] Field of Search ............... 422/220, 190, 191, 192, 422/148, 224, 197, 310, 158, ; 48/94, 95; 60/39.01, 39.06; 431/170, 181, 188, 198; 122/40; 585/541, 542

[56] References Cited

U.S. PATENT DOCUMENTS

| | | |
|---|---|---|
| 433,871 | 8/1890 | Meyers . |
| 2,102,152 | 12/1937 | Hays ................................. 431/170 |
| 2,195,227 | 3/1940 | Sachsse . |
| 2,493,017 | 1/1950 | Nutter . |
| 2,559,979 | 7/1951 | Martois et al. . |
| 2,630,461 | 3/1953 | Sachsse et al. . |
| 2,656,254 | 10/1953 | Heller ................................. 23/209.4 |
| 2,700,598 | 1/1955 | Odell . |
| 2,701,011 | 2/1955 | Bonvillian et al. . |
| 2,790,838 | 4/1957 | Schrader . |
| 2,827,112 | 3/1958 | Inskeep . |
| 2,843,592 | 7/1958 | Ludwig et al. . |
| 3,473,323 | 10/1969 | Briggs et al. . |
| 3,809,524 | 5/1974 | Bruhlet et al. . |
| 3,871,838 | 3/1975 | Henkel et al. . |
| 3,881,857 | 5/1975 | Hoy et al. ................................. 431/7 |
| 3,914,089 | 10/1975 | Desty et al. ................................. 431/7 |
| 3,927,998 | 12/1975 | Child et al. . |
| 4,136,015 | 1/1979 | Kamm et al. . |
| 4,166,834 | 9/1979 | Reed et al. . |
| 4,409,196 | 11/1983 | Skinner . |
| 4,477,262 | 10/1984 | Pryor . |
| 4,522,894 | 6/1985 | Hwang et al. . |

FOREIGN PATENT DOCUMENTS 367747 8/1930 United Kingdom .
1394813 5/1975 United Kingdom .

OTHER PUBLICATIONS

Tacina, Technical Paper Presented at the Second Workshop on Catalytic Combustion, June 21–22, 1977.
Spadaccin et al., Combustion and Flame, Autoignition characteristics of Aircraft-Type Fuels, 1982, pp. 283–300.

Primary Examiner—Michael S. Marcus
Assistant Examiner—D. John Griffith Jr.
Attorney, Agent, or Firm—Bernard, Rothwell & Brown

[57] ABSTRACT

A gas mixer and distributor for a reactor has first and second inlet chambers with the second inlet chamber being interposed between the first inlet chamber and an entrance to a reaction chamber. Walls form tubular or slit-like passageways extending from the first chamber to the entrance of the reaction chamber through the second chamber. Upper portions of the passageways have uniform cross-sections selected to produce gas velocities above the flashback velocity, as well as producing turbulence to completely mix gas passing from the second chamber through orifices in the walls of the passageways. Lower sections of the passageways gradually increase in cross-section to reduce velocity and minimize vortexing and recirculation at the entrance to the reactor chamber.

13 Claims, 4 Drawing Sheets

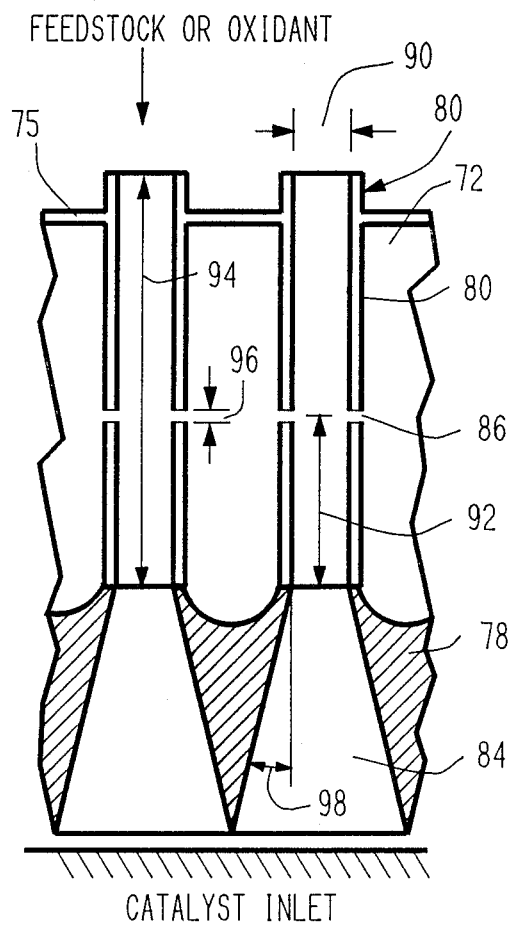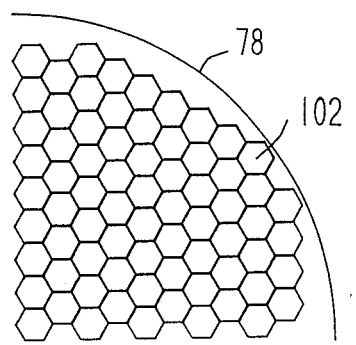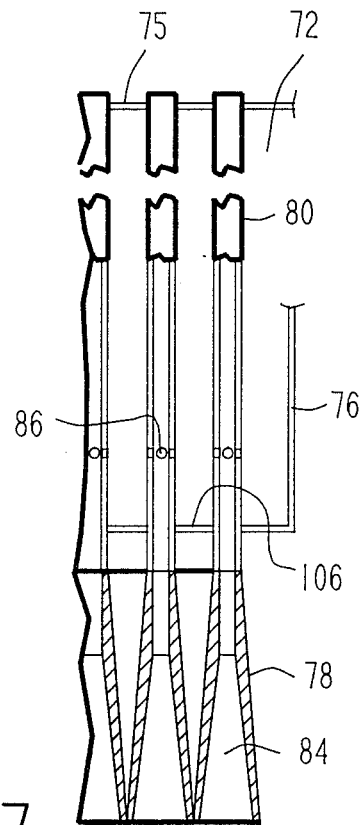

GAS MIXER AND DISTRIBUTOR FOR REACTOR

BACKGROUND OF THE INVENTION

1. Field of the Invention

The present invention relates to apparatus for mixing two or more gas streams and distributing the gas mixture to the input of a reactor, for example, mixing a gaseous hydrocarbon feedstock with an oxygen-containing gas and feeding the mixture to a catalytic reactor for partial oxidation of the feedstock.

2. Description of the Prior Art

Partial oxidation catalytic reactors are useful for reforming hydrocarbons by reacting a gaseous mixture of the hydrocarbon, which may be a hydrocarbon gas or a vaporized liquid hydrocarbon, and an oxidant which may be steam, oxygen, air, or a mixture thereof to form a product including hydrogen, methane, carbon dioxide and carbon monoxide. The product stream can be used as a fuel and/or can be used as a basic feedstock for the production of hydrogen or carbon monoxide or for the synthesis of one or more products such as ammonia, methanol, carbonylated compounds, hydrogenated compounds, etc.

In the mixing and feeding of the gaseous reactants to such reactors, the prior art has long recognized the need for complete mixing of the gaseous reactants as well as the need for preventing flashback of a flame from the reaction chamber into the mixing chamber. Failure to produce complete mixing reduces the quality of the product which then would include excessive completely oxidized components, unoxidized components and free carbon which produces undesirable carbon deposits. Flashback causes similar results and, in addition, can cause heat damage to mixing and distributing equipment.

One prior art technique for eliminating flashback is to interpose a distributor having one or more restricted passageways between the mixing chamber and the reaction chamber. The gas mixture must flow through the restricted passageway or passageways at a velocity exceeding the flashback velocity, i.e., the velocity at which a flame can advance in the combustible mixture from reaction chamber to the mixing chamber. This type of distributor also recognizes the importance of providing a gradual enlarging of the cross-sectional area from the narrow throat or restricted passageway to the entrance of the reaction chamber in order to reduce to a minimum swirling or vortex formation of the flow at the reactor entrance which would promote flashback. In devices having a distributor interposed between a mixing chamber and a reaction chamber, the mixing chamber can contain an explosive mixture and a drop in input or output flows could result in damage.

In one prior art apparatus disclosed in U.S. Pat. No. 3,871,838, there is shown a device for reforming gasoline into a higher octane gaseous fuel wherein a plurality of tubes with a plurality of openings are arranged across the entire cross-section of the flow of vaporized gas for mixing oxygen therewith and for forming narrowed passageways. Baffles formed as part of the walls of the tubes have plane surfaces and gradually enlarge the narrowed passageways in the direction of the reactor. Although this and other prior art devices are disclosed as being suitable for providing increased octane fuel for an automobile combustion engine which burns cleaner and produces less pollution, such apparatus generally is not suitable for large scale hydrocarbon conversion such as may be associated with relatively large scale petroleum refining or synthetic gas-producing installations.

SUMMARY OF THE INVENTION

The invention is summarized in a gas mixer and distributor for feeding a gaseous reaction mixture to a reactor wherein the mixer and distributor has first and second chambers into which respective first and second respective gaseous reactants are fed and wherein the second chamber is interposed between the first chamber and an entrance of the reactor and there are included enclosed walls, such as tubes or channels, forming a plurality of narrow passageways extending from the first chamber through the second chamber for conducting streams of the first gas to the reactor and with orifices formed in the walls of the narrow passageways for providing streams of the second gas for being mixed within the passageways with the first gaseous reactant, the streams through the passageways being turbulent and at a velocity exceeding a flashback velocity of the mixture. The narrow passageways have first sections of uniform cross-section with first ends communicating with the first chamber and have second sections of gradually increasing cross-section communicating between the second end of the first section and the reactor, with the orifices being positioned within the first sections spaced from the second ends of the first passageway sections by a distance sufficient to insure substantial complete mixing of the first and second gaseous reactants prior to entering the second reactor.

An object of the invention is to construct a gas mixer and distributor for a reactor with reduced under and over reacted product portions and reduced undesirable byproducts.

Another object of the invention is to increase reactor yield by improving the uniformity and completeness of mixing of the reactor input.

One feature of the invention is the provision of a plurality of narrow passageways having elongated straight throat sections wherein gaseous reactants are combined and wherein the gaseous velocity exceeds the flashback velocity together with being turbulent to substantially mix the reactant gases within the straight sections.

Another feature of the invention is the provision of a plurality of straight, narrow passageway sections with injection of second gas streams through side wall orifices to produce turbulent flow at a velocity greater than the flashback velocity for a distance in the straight, narrow passageway sections between the orifices and exit points of the straight, narrow passageway sections equal to or greater than that resulting in substantial complete mixing of the gases.

Other objects, advantages and features of the invention will be apparent from the following description of the preferred embodiments taken in conjunction with the accompanying drawings.

BRIEF DESCRIPTION OF THE DRAWINGS

FIG. 5 is a diagrammatic elevational cross-sectional illustration of a broken-away portion of the mixer and feeder of FIGS. 1 and 2 showing critical dimensions.

FIG. 6 is a bottom view similar to FIG. 4 but of a modified distributor structure.

FIG. 7 is an enlarged elevational cross-sectional view similar to FIG. 2 but of a modified mixer and distributor.

DESCRIPTION OF THE PREFERRED EMBODIMENTS

Figure 1:
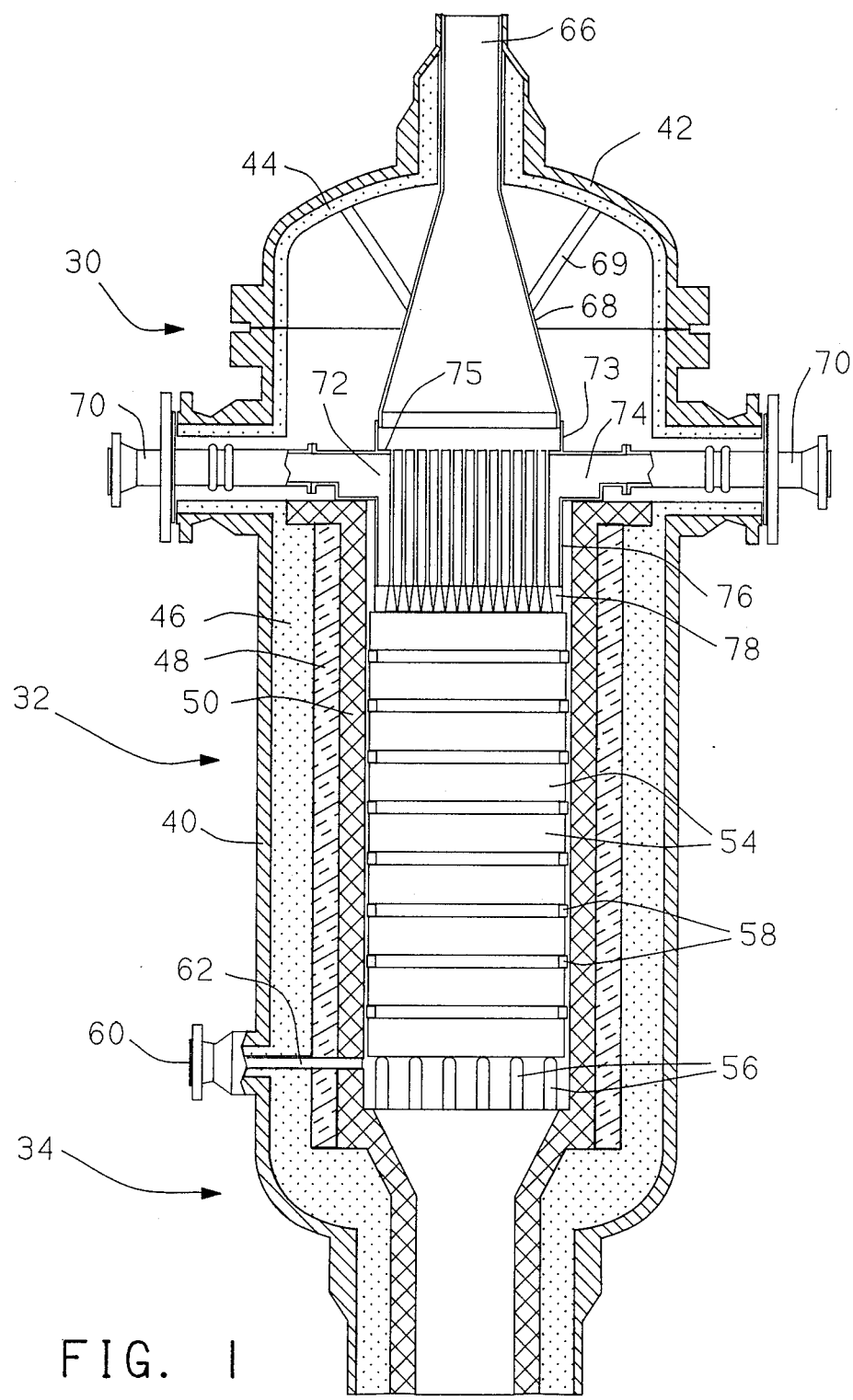
FIG. 1 is an elevational cross-section view of a reactor having at its input a mixer and distributor in accordance with the invention.

As shown in FIG. 1, a reactor for partially oxidizing a gaseous feedstock includes an input mixing and distributor section indicated generally at 30 in accordance with the present invention. The mixer and distributor 30 mixes the feedstock with an oxidant and distributes the mixture to the entrance of a catalytic reactor section indicated generally at 32 wherein the feedstock is partially oxidized or reformed to produce a product which is then passed through the exit section indicated generally at 34. The feedstock may be a hydrocarbon gas or a vaporized hydrocarbon liquid which is to undergo conversion. The oxidant is an oxygen-rich gas stream which may be substantially pure oxygen, air or oxygen enriched air. Steam may be included in the hydrocarbon feedstock and/or the gaseous oxidant stream. The mixer and distributor is suitable for use in a reactor performing the process as described in application U.S. Pat. No. 085,160 filed on even date herewith for Production of Synthesis Gas From Hydrocarbonaceous Feedstock by Joseph D. Korchnak and Michael Dunster.

The mixer and distributor 30 can be employed in many types of reactors, in addition to the disclosed example of a catalytic partial oxidation reactor for a raw hydrocarbon stream, which require uniformity and thorough mixing of two or more gaseous reactants being fed to a reaction chamber. It is particularly suitable for exothermic reactions where it is desired to perform the reaction in a controlled manner within a catalyst. Examples of other reactors include those employed in autothermal reforming or secondary reforming to produce products such as ammonia, methanol, synthesis gas, etc.

The reactor includes an outer shell 40 of structural metal such as carbon steel with a top 42 secured thereon by bolts (not shown) or the like. A layer 44 of insulation, such as 2300° F. (1260° C.) BPCF ceramic fiber insulation, is secured to the inside of the upper portion of the shell 40 including the top 42. In the lower portion of the mixing section 30 and in the reactor section 32 and outlet section 34, there are secured layers 46, 48 and 50 on the inside of the shell. The layer 46 is a castable or equivalent insulation such as low iron high purity 2000° F. (1090° C.) ceramic insulation. The layer 48 is also a castable or equivalent layer of insulation but containing 60% alumina for withstanding 3000° F. (1650° C.). The internal layer 50 is a refractory or equivalent layer such as at least 97% alumina with ceramic anchors or at least 97% alumina brick for withstanding the interior environment of the reactor section.

Additionally, in order to prevent diffusing of reactants and consequently combustion within the refractory layer, a non-porous metal alloy sheath may be provided on the inside of the refractory between the refractory wall 50 and the catalyst bed 54.

The reactor section 32 has a stack of commercial monolithic catalyst discs 54 separated by high alumina rings 58 between each adjacent pair of discs. The stack is supported by a grill with high alumina bars 56. The catalyst material is selected in accordance with the reaction being performed. For partial oxidation reactions, platinum-palladium catalyst materials, rhodium catalyst materials, other high surface area catalyst materials such as alumina or catalyst materials employed in catalytic converters of automobile exhaust systems are suitable. One disclosure of suitable catalyst materials is found in U.S. Pat. No. 4,522,894 for a catalyst used in a first catalyst bed for partial oxidation.

A port 60 is formed in the lower end of the reaction section and has a tube 62 extending below the bottom refractory disc 54 for measuring temperature or withdrawing samples of the product.

The outlet section 34 is suitably formed for being connected to a downstream heat recovery boiler (not shown) and/or other processing equipment.

Figure 2:
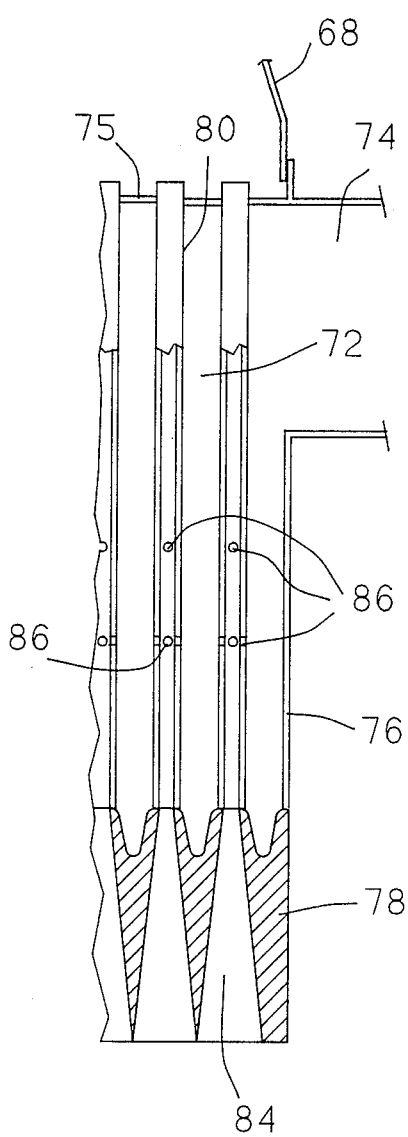
FIG. 2 is an enlarged elevational cross-section view of a broken-away portion of the mixer and distributor of FIG. 1.
Figure 3:
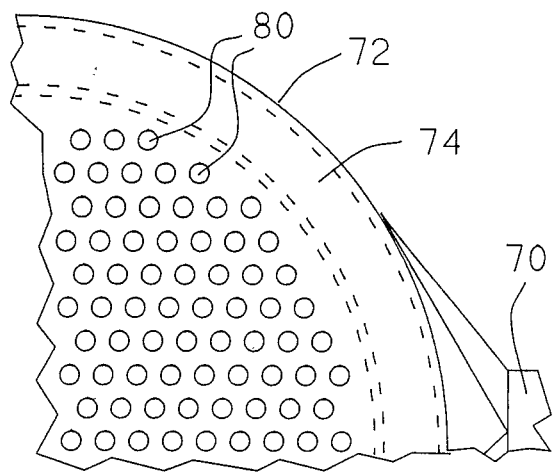
FIG. 3 is a top view of a broken-away quarter sector of the mixer and distributor of FIG. 1.

In the input section 30 a first inlet 66, ported centrally through the top 42 communicates to an upper feed cone 68, or optional to interior of the upper portion of the vessel 40, which forms a first chamber. The cone 68 is fastened by supports 69 in the top 42. Second inlets 70 extend through side ports of the shell 40 and communicate to a second chamber 72 which is interposed between the upper chamber 68 and the inlet of the catalyst reaction section 32. A ring 73 mounted on the central portion of an upper wall 75 of the chamber 72 sealingly engages the lower edge of the cone 68 so that the wall 75 forms a common wall between the upper chamber 68 and lower chamber 72. The chamber 72 has an upper outer annular portion 74, see also FIGS. 2 and 3, which is supported on the top surface of the refractory layer 50 or anchored to the shell 40. A lower portion of the chamber 72 has a tubular wall 76 which extends downward in the refractory sleeve 50. The bottom of chamber 72 is formed by a cast member 78.

A plurality of elongated tubes 80 have upper ends which are mounted in the upper wall 75 of the chamber 72 with the lumens of the tubes at the upper end communicating with the upper chamber 68. The bottom ends of the tubes 80 are secured to the member 78 with the lumens of the tubes communicating with the upper ends of passageways 84 formed vertically through the member 78. Orifices 86 are formed in the walls of the tubes 80 for directing streams of gas from the chamber 72 into the lumens of the tubes 80.

The inlets 66 and 70, the cone 68, the supports 69 are formed from a conventional corrosion and heat resistant metal, such as stainless steel or high temperature alloy, while the chamber 72, tubes 80 and member 78 are formed from a conventional high temperature alloy such as Hastalloy X or refractory type material.

The number of tubes 80, the internal diameter 90 (see FIG. 5) of the tubes 80, the size and number of the orifices 86 in each tube are selected relative to the gas input velocities and pressures through inlets 66 and 70 so as to produce turbulent flow within the tubes 80 at a velocity exceeding the flashback velocity of the mixture. The minimum distance 92 of the orifices 86 from the bottom end of the tube 80 at the opening into the diverging passageways 84 is selected to be equal to or greater than that required for providing substantially complete mixing of the gas streams from chambers 68 and 72 under the conditions of turbulence therein. The size of the internal diameter 90 of the tubes 80 as well as the length 94 of the tubes is designed to produce a sufficient pressure drop in the gas passing from the chamber 68 to the reaction chamber so as to provide for substantially uniform gas flows through the tubes 80 from the chamber 68. Likewise the size of the orifices 86 is selected to provide sufficient pressure drop between the chamber 72 and the interior of the tubes 80 relative to the velocity and pressures of the gas entering through inlets 70 so as to provide substantially uniform volumes of gas flows through the orifices 86 into the tubes 80.

The minimum gas velocity within the tubes 80 is selected in accordance with the type, temperature and density of the gas being reacted. For a mixture of natural gas and air with substantially no hydrogen content at ambient temperature and pressure, a minimum velocity of 3 ft./sec (1 m/sec) is suitable, but for higher inlet temperatures or pressures or a higher hydrogen content, the minimum velocity must be increased. Typical minimum velocities for mixtures of hydrocarbon gas and air at an inlet pressure of 400 psig (2750 KPa) and inlet temperatures of 500° C. in partial oxidation reactions are from 20 to 180 ft/sec (6 to 55 m/sec) or above.

Figure 4:
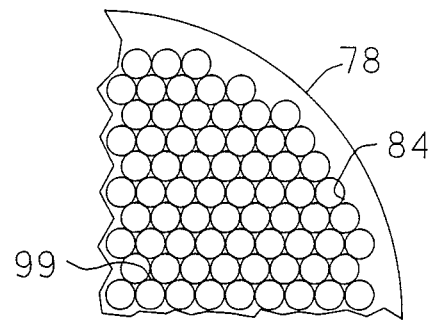
FIG. 4 is a bottom view of a broken-away quarter section of the mixer and distributor of FIG. 1.

The diverging passageways in the member 78 are formed in a manner to provide for reduction of the velocity of the gas to produce uniform gas distribution over the inlet of the catalyst. The sides of the passageways in member 78 in the vertical plane cross-section, may be either straight or curved. The rate of increase of the horizontal cross-sectional area of the passageway 84 as it proceeds downward, i.e., the angle 98 that the wall of the passageway 84 makes with the straight wall of the tubes 80, must generally be equal to or less than about 15° and preferably equal to or less than 7° in order to minimize or avoid creating vortices within the passageways 84 which would promote production of flame in the passageway 80. The configuration of the bottom end of the passageway 84, as shown in FIG. 4 is circular. In order to eliminate the area of metal 99 which would lead to vortex formation at the outlet of member 78, the passageways 84 may be extended causing the adjacent passageways to converge until the area of metal 99 is reduced to a point. FIG. 6 illustrates a modification wherein passageways 102 are formed with hexagonal bottom openings. Various other cross-sectional bottom openings, such as rectangular, triangular, etc. may be devised to provide substantially uniform distribution of the gas mixture flow to the catalyst inlet.

Some flame may occur in the passageway 84, particularly adjacent to the catalyst bed, but the oxidation reaction mainly occurs within the catalyst bed. It is possible to also have the gas inlet temperatures above the ignition temperature of the gas mixture; under these conditions the gas velocities in the tubes 80 are selected to produce a residence time in the tubes 80 and passageways 84 which is insufficient to produce complete reaction of the gas mixture.

It has been found that if gases entering the diverging passageways 84 are not completely mixed prior to entering, the gases tend to remain unmixed after turbulent flow ceases while diverging and decreasing in velocity. However, within the elongated passageway sections in the tubes 80 which have a uniform cross-section throughout their lengths, it is found that complete mixing of the gases occurs in the minimum distance 92 due to the high velocity turbulent flow. Additionally, the injection of the streams through orifices 86 transverse to the flow in the tubes 80 creates additional turbulence in streams progressing down the tubes to further enhance the mixing.

In a variation shown in FIG. 7, the bottom of the chamber 72 is closed by a wall 106 instead of by the cast member 78. The tubes 80 extend through the wall 106 to which the tubes are sealed such as by welding. The lower ends of the tubes 80 protrude downward and are engaged in upper ends of the passageways 84 which have an upper portion contiguous and uniform in cross-section with the lumens of the tubes 80. Additionally, the member 78 is open around the wall forming the passageway 84 to thus reduce the weight and required amount of material forming the member 78.

Figure 8:
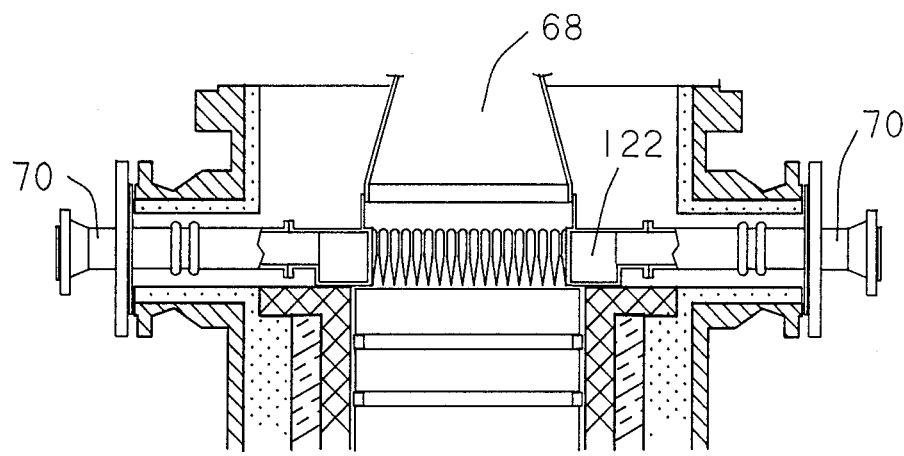
FIG. 8 is an elevational cross-sectional view of a broken-away portion of a reactor with a further modified mixer and distributor input in accordance with the invention.
Figure 9:
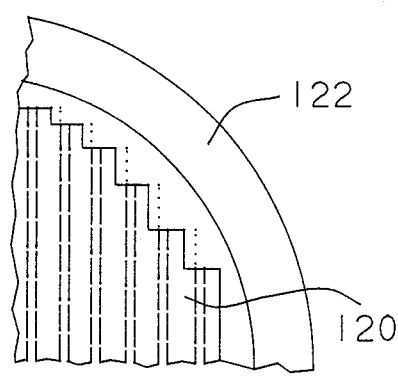
FIG. 9 is a top view of a broken-away quarter sector of a mixer and distributor in FIG. 8.
Figure 10:
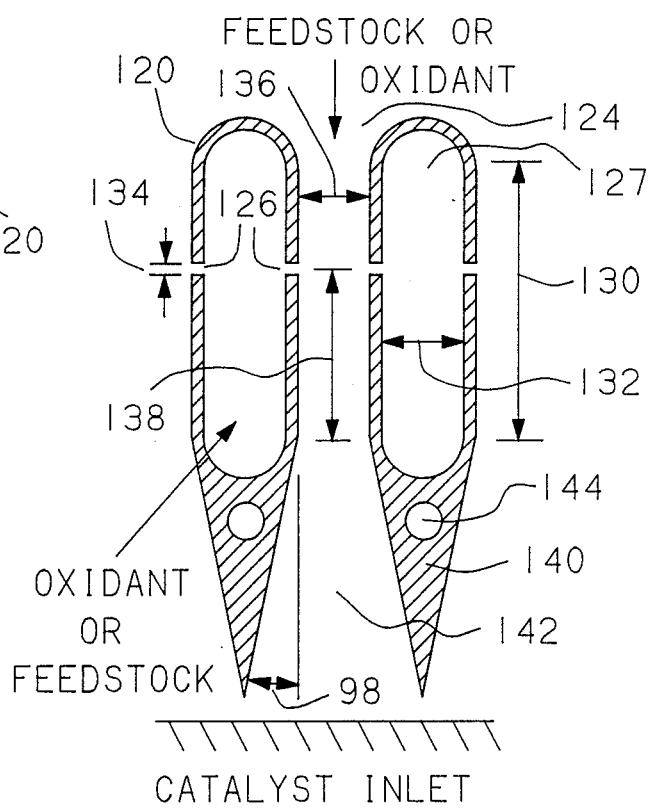
FIG. 10 is an enlarged elevational view of a portion of the mixer and distributor of FIG. 8.

In a further modification illustrated in FIGS. 8, 9 and 10, the elongated uniform cross-section of the upper passageway sections joining to the chamber 68 is formed by slit-like passageways 124 between horizontal tubular members 120. The tubular members 120 are connected at opposite ends to an annular chamber 122 which receives the flow of the gas through inlets 70. Orifices 126, formed in horizontal rows communicate from the interior chamber 127 of the tubular members 120 to the passageways 124. The vertical length 130, as well as the horizontal width 132 of the chambers 127 in the tubes 120 are selected to maintain uniform pressure throughout the horizontal length of the tubes 120, and the number and the diameter 134 of the orifices 126 are selected to promote uniform flow of gas through the orifices so as to provide for substantial pressure drop through the orifices 126 to promote uniform flow of gas from the tubes 120 into the slit-like passageways 124. The width 136 of the passageways 124 as well as the vertical dimension thereof are selected to produce a pressure drop from the upper chamber 68 so as to maintain uniform distribution across the entrances of the passageways 124 and thus provide uniformity of flow of gas through the passageways 124 while permitting a velocity greater than the flashback velocity of the gas mixture as well as a turbulent flow. The minimum distance 138 that the orifices 126 are above the lower end of the uniform cross-sectional portion of the passageways 124 is equal to or greater than that producing substantially complete mixing of the gas streams. Lower wedge shaped members 140 are mounted on or integral with the bottom edges of the tubes 120 for forming diverging lower sections 142 of the passageways so as to decrease the flow velocity and minimize or avoid gas eddies or spiral flow at the catalyst inlet. Passages 144, optional, are formed through the members 140 to carry a cooling liquid, such as water.

Figure 11:
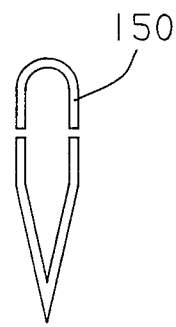
FIG. 11 is a cross-sectional view of a modified tubular element of FIG. 10.

In FIG. 11 is illustrated a modified tube 150 which may replace the tubes 120. The modified tube 150 is formed to a point at its lower end to form the shape of the wedge members 140 of FIG. 10 and thus eliminate the need for the wedge members 140.

In an example of a catalytic partial oxidation reactor of the construction shown in FIG. 1, there are included nine catalyst discs 54, each having a diameter of 30 inches (0.76 m) and a thickness of 6 inches (0.15 m) for partially oxidizing a hydrocarbon stream, e.g., natural gas containing 95% by volume methane with the balance including ethane, propane, nitrogen and carbon dioxide. The gas is mixed with steam and air to form a mixture containing approximately 20% volume natural gas, approximately 60% volume air and approximately 20% volume steam. The steam is divided and introduced in both the natural gas and air streams prior to the inlets 66 and 70. The hydrocarbon gas at a temperature of 550° C. is supplied through 10 inch (0.254 m) diameter inlet 66 at a pressure of 400 psia (2760 KPa) and a velocity of 100 ft/sec (130 m/sec). The air stream at a temperature of 550° C. is supplied through two 8 inch (0.152 m) inlets 70 at a pressure of 430 psia (2960 KPa) and a velocity of approximately 110 ft/sec (34 m/sec). The diameter of the lower portion 76 of chamber 72 is 27 inches (0.68 m) with the diameter of the upper portion 74 being 36 inches (0.91 m). There are 261 tubes 80 having 0.5 inch (12.7 mm) internal diameter and having lengths of 20 inches (0.51 m). Six orifices 86 of 0.125 inch (3.2 mm) diameter are formed in each tube 80 with four of the orifices evenly spaced around each tube at a distance of 4 inches (0.102 m) above the lower end of the tube and with the remaining two orifices formed opposite each other at a distance 6 inches (0.152 m) above the lower end of the tube. The bottom member 78 has a thickness of 5 inches (0.127 m) and the passageway sections 84 are conical with upper diameters of 0.5 inch (12.7 mm) and lower diameters of 1.75 inches (44.5 mm). Pressures within the chambers 68 and 72 are maintained at about essentially the inlet pressures. Gas velocity in the tubes 80 above the upper orifices is about 170 ft/sec (52 m/sec) and between the lower orifices and the lower end of the tubes is about 350 ft/sec (107 m/sec). In the diverging passageways 84, the gas velocity decreases from 350 ft/sec (107 m/sec) at the upper end to 30 ft/sec (9 m/sec) at the lower end or entrance to the catalyst.

The various dimensions set forth in the above example are designed for reaction of one specific hydrocarbon gas and air supplied at specific rates. It is noted that these dimensions and velocities will change for different hydrocarbon gases, oxygen or enriched air, different catalysts, and different supply rates.

Since many modifications, variations and changes in detail may be made to the above described embodiments, it is intended that all matter described in the foregoing description and shown in the accompanying drawings be interpreted as illustrative and not in a limiting sense.

What is claimed is:

1. A gas mixer and distributor for feeding a gaseous reaction mixture to a reactor, the gas mixer and distributor comprising:

means for forming a first chamber with a first inlet for receiving a first gaseous reactant;

means forming a second chamber with a second inlet for receiving a second gaseous reactant;

said second chamber being interposed between the first chamber and an entrance of a reaction chamber;

means including a plurality of tubes and forming a plurality of elongated passageways extending from the first chamber through the second chamber to the reactor;

each of said plurality of elongated passageways including a first elongated section of uniform cross-section communicating at a first end with the first chamber, and a second section of gradually increasing cross-section communicating between the second end of the first section and the reactor entrance;

said cross-sections of first passageway sections being designed to provide turbulent gas flows therethrough at uniform velocities exceeding a flashback velocity of a mixture of the first and second gaseous reactants;

a plurality of orifices in the tubes and communicating between the second chamber and the respective plurality of first passageway sections for passing streams of the second gaseous reactant into the first passageway sections;

said orifices having sizes designed to provide uniform velocities of the second gaseous reactant into the first passageway sections;

said orifices further being spaced from the second ends of the first passageway sections to insure substantially complete mixing of the first and second gaseous reactants prior to entering the reaction chamber; and said gradually increasing cross-section of the second passageway sections designed to decrease the flow velocity of the mixture of gaseous reactants and to distribute the flow of the mixture uniformly across the reaction chamber without formation of vortices.

2. A gas mixer and distributor as claimed in claim 1 wherein the diameter and length of the tubes are designed to provide a sufficient pressure drop in the first reactant gas between the first chamber and the reaction chamber to produce substantially uniform gas flows through the tubes, and the sizes of the orifices are designed to provide sufficient pressure drop between the second chamber and the interior of the tubes to produce substantially uniform volume of gas flows through the orifices into the tubes.

3. A gas mixer and distributor as claimed in claim 1 wherein the plurality of orifices in the tubes are spaced from the second ends of the first passageway sections to insure substantially complete mixing of the first and second gaseous reactants within the first passageway sections prior to entering the second passageway sections.

4. A gas mixer and distributor as claimed in claim 1 wherein the tubes have upper ends mounted in an upper wall of the second chamber and communicating with the first chamber.

5. A mixer and distributor as claimed in claim 4 wherein the second sections of the passageways are formed through a member forming the bottom wall of the second chamber.

6. A mixer and distributor as claimed in claim 4 wherein the tubes extend through and are secured in a bottom wall of the second chamber, and a member is mounted below the second chamber and has the second sections of the passageways formed therethrough.

7. A gas mixer and distributor as claimed in claim 1 wherein the cross-sections of the first passageway portions are designed to produce gas flows therethrough greater than a minimum velocity of 1 meter per second.

8. A gas mixer and distributor as claimed in claim 7 wherein the minimum velocity is 6 meters per second.

9. A gas mixer and distributor as claimed in claim 7 wherein the minimum velocity is 55 meters per second.

10. A gas mixer and distributor for feeding a gaseous reaction mixture to a reactor, the gas mixer and distributor comprising:

means forming a first chamber with a first inlet for receiving a first gaseous reactant;

means forming a second chamber with a second inlet for receiving a second gaseous reactant;

said second chamber being interposed between the first chamber and an entrance of a reaction chamber;

said second chamber including horizontal distributor tubes which have vertically elongated cross-sections for forming a plurality of vertically elongated slit-like passageways extending from the first chamber to the reactor between the horizontal distributor tubes, each of said plurality of vertically elongated passageways including a first vertically elongated section of uniform cross-section communicating at a first end with the first chamber, and a second vertically elongated section of gradually increasing cross-section communicating between the second end of the first section and the reactor entrance;

said cross-sections of first passageway sections being designed to provide turbulent gas flows therethrough at a velocity exceeding a flashback velocity of a mixture of the first and second gaseous reactants;

a plurality of orifices in the distributor tubes and communicating between the second chamber and the respective plurality of first passageway sections for passing streams of the second gaseous reactant into the first passageway sections;

said orifices having sizes designed to provide uniform velocity of the second gaseous reactant into the first passageway sections;

said orifices further being spaced from the second ends of the first passageway sections to insure substantially complete mixing of the first and second gaseous reactants within the first passageway sections prior to entering the second passageway sections; and said gradually increasing cross-section of the second passageway sections designed to decrease the flow velocity of the mixture of gaseous reactants and to distribute the flow of the mixture uniformly across the reaction chamber.

11. A gas mixer and distributor as claimed in claim 10 including wedge-like members mounted or integral with the lower edges of the horizontal tubular members for forming the second sections of the passageways.

12. A gas mixer and distributor as claimed in claim 10 wherein the lower edges of the horizontal tubular members are formed with wedge-like configurations to form the second sections of the passageways.

13. A gas mixer and distributor for feeding a gaseous reaction mixture to a reactor, the gas mixer and distributor comprising:

means forming a first chamber with a first inlet for receiving a first gaseous reactant;

means forming a second chamber with a second inlet for receiving a second gaseous reactant;

said second chamber being interposed between the first chamber and an entrance of a reaction chamber;

means including enclosed walls forming a plurality of elongated passageways extending from the first chamber through the second chamber to the reactor;

each of said plurality of elongated passageways including a first elongated section of uniform cross-section communicating at a first end with the first chamber, and a second section of gradually increasing cross-section communicating between the second end of the first section and the reactor entrance;

said cross-sections of first passageway sections being designed to provide turbulent gas flows therethrough at a velocity exceeding a flashback velocity of a mixture of the first and second gaseous reactants;

a plurality of orifices in the enclosed walls and communicating between the second chamber and the respective plurality of first passageway sections for passing streams of the second gaseous reactant into the first passageway sections;

said orifices having sizes designed to provide uniform velocity of the second gaseous reactant into the first passageway sections;

said orifices further being spaced from the second ends of the first passageway sections to insure substantially complete mixing of the first and second gaseous reactants prior to entering the reaction chamber;

said gradually increasing cross-section of the second passageway sections designed to decrease the flow velocity of the mixture of gaseous reactants and to distribute the flow of the mixture uniformly across the reaction chamber; and means for directing a cooling liquid flow in the mixer and distributor for cooling the mixer and distributor.

* * * * *

UNITED STATES PATENT AND TRADEMARK OFFICE
CERTIFICATE OF CORRECTION

PATENT NO. : 4,865,820

DATED : September 12, 1989

INVENTOR(S) : MICHAEL DUNSTER ET AL.

It is certified that error appears in the above-identified patent and that said Letters Patent is hereby corrected as shown below:

Col. 3, line 42,   after "Pat." insert --Application--.

Col. 7, line 58,   delete "for" (first occurrence).

Signed and Sealed this

Twenty-eighth Day of August, 1990

Attest:

HARRY F. MANBECK, JR.

*Attesting Officer*   *Commissioner of Patents and Trademarks*